Figure 1:
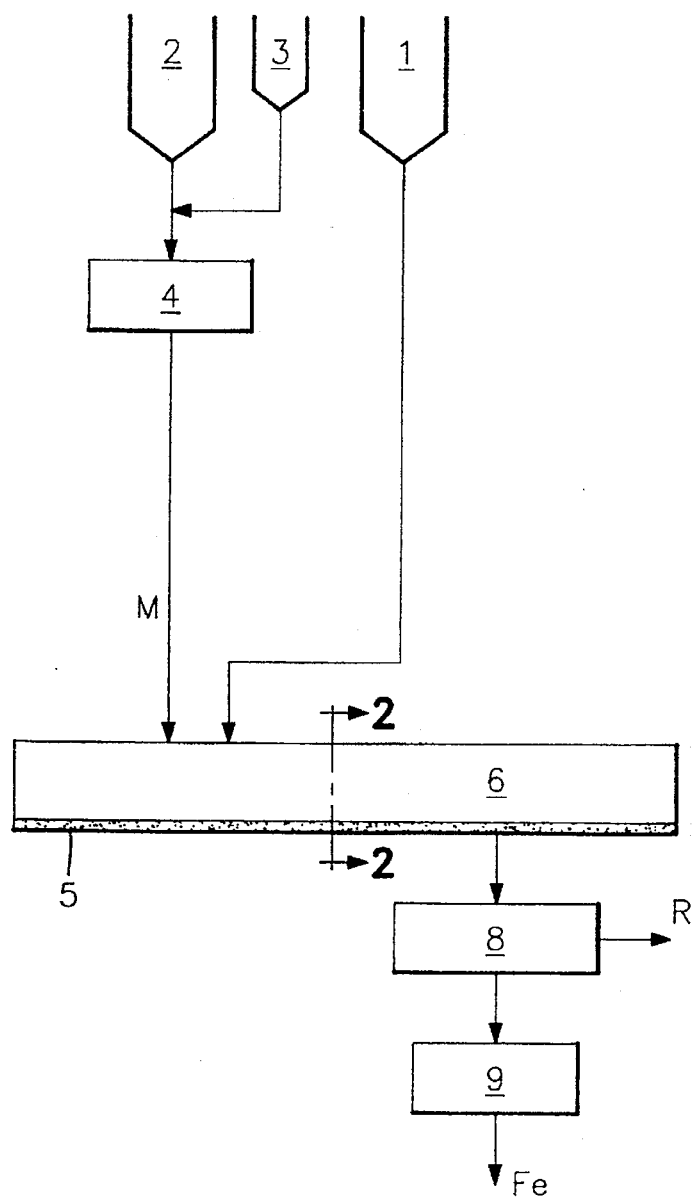

United States Patent [19]

Munnix et al.

[11] Patent Number: 5,637,133

[45] Date of Patent: Jun. 10, 1997

[54] PROCESS FOR MANUFACTURING SPONGE IRON WITH LOW SULPHUR CONTENT

[75] Inventors: René Munnix, Battice; Didier Steyls, Brussels; Marios Economopoulos; Jean Borlee, both of Liége, all of Belgium

[73] Assignee: CRM, Brussels, Belgium

[21] Appl. No.: 500,355

[22] Filed: Jul. 10, 1995

[30] Foreign Application Priority Data

Jul. 13, 1994 [BE] Belgium .................. 09400652

[51] Int. Cl.⁶ ........................................... C21B 11/08
[52] U.S. Cl. ............................... 75/484; 75/503
[58] Field of Search ........................... 75/484, 503

[56] References Cited

U.S. PATENT DOCUMENTS

| | | |
|---|---|---|
| 4,189,312 | 2/1980 | Kranz et al. |
| 4,701,214 | 10/1987 | Kaneko et al. .................. 266/177 |
| 5,186,741 | 2/1993 | Kotraba et al. .................. 75/656 |

OTHER PUBLICATIONS

J. Pargeter et al, "Ironmaking Using The Inmetco Process And Related Technologies," Proceedings of the 44th Ironmaking Conference, Apr., 1985, pp. 275–285.

*Primary Examiner*—Melvyn Andrews
*Attorney, Agent, or Firm*—Jacobson, Price, Holman & Stern, PLLC

[57] ABSTRACT

A process of manufacturing a sponge iron with low sulphur content by depositing a charge made up of superposed layers of finely divided material on a moving hearth, at least one of the layers being substantially made up of iron oxides and at least another of the layers being made up of a mix of a solid reducing agent containing carbon and a desulphurizing agent, heating the charge to cause at least partial gasification of the solid reducing agent containing carbon in the form of gaseous compounds of carbon and sulphur, reducing the iron oxides by at least part of carbon monoxide (CO) contained in the gaseous carbon compounds, fixing at least part of the sulphur of the gaseous sulphur compounds by the desulphurizing agent, and separating the reduced iron oxides from the material containing the residues of the solid reducing agent containing carbon and the desulphurizing agent.

12 Claims, 1 Drawing Sheet

PROCESS FOR MANUFACTURING SPONGE IRON WITH LOW SULPHUR CONTENT

The present invention concerns a process for manufacturing sponge iron with low sulphur content. For the purposes of the present invention sponge iron is a ferrous matter obtained by a reduction operation so called direct, from iron oxide. Traditionally iron oxide comes from minerals where it is accompanied by various undesirable substances forming a gangue. At present, an interesting source of iron oxide is also constituted by the superficial oxides collected at different stages of the processes of iron and steelmaking such as mill scales and pickling sludges. This category of oxides does not include any gangue but it is frequently full of impurities such as residues of oils or greases.

The description which follows will make reference to the general term iron oxide; this term takes in here as well as the usual iron minerals, the oxides coming from iron and steelmaking; either separately or mixed in no matter what proportions.

Sponge iron is generating an increasing interest at present in particular with a view to its use in converters and especially in the electric steel furnaces. Until now, the metal charge of these devices has been principally composed of scrap iron which makes up the usual charge of liquid iron. One notes however that the quality of this scrap iron has a tendency to deteriorate notably because of the alloy element content which can be undesirable for the steels envisaged. Moreover the price of scrap iron varies sometimes considerably not only in accordance with quality but also with availability which can adversely affect the provisioning of electric steelworks in particular.

The technology is known for producing sponge iron in a number of ways. These processes are based on the use of a reducing agent which is generally either gaseous or solid. The process which is the subject of the invention belongs in the category of the processes based on the use of a solid reducing agent which is essentially an agent containing carbon and especially finely separated coal.

The known processes in this field are in use in various furnaces such as shaft furnaces, fluidized bed furnaces or rotary furnaces which can require substantial investment and involve high maintenance costs. Moreover the processes presently known suffer from at least one serious disadvantage; some of these processes call for a very high coal consumption in the order of 700 kgs of coal per metric ton of sponge iron produced, while other processes lead to very high sulphur content in the iron sponge, unacceptable in electric steelworks.

By U.S. Pat. No. 4,701,214 in particular a process for making sponge iron is already known whereby pellets made up of finely separated iron oxides and a granular combustible material containing carbon are heated in a rotary hearth furnace where they are reduced by one part of Co released by the coal and then cooked by the heat resulting from the combustion of the supernatant Co. The sponge iron produced by this process however contains a high percentage of sulphur which does not allow economic use of this sponge iron in an electric furnace.

The object of the present invention is a manufacturing process of sponge iron based on the reasonably economical use of a solid reducing agent containing carbon which enables at the same time the limitation of the sulphur content to a level compatible with the requirements of arc furnaces in steelworks. Moreover this process does not require the large investment mentioned before nor the use of binding materials.

The present invention, a process for manufacturing a sponge iron with low sulphur content which utilises a solid reducing agent containing carbon, is characterized in that one deposits on a mobile floor a charge made up of superposed layers of finely separated matter, in that at least one of the said layers is primarily made up of iron oxides, in that at least one other layer is made up of a mix of the said solid reducing agent containing solid carbon and a desulphurising agent, in that by heating the said charge one induces at least partial gasification of the said solid reducing agent containing carbon in gaseous compounds of carbon and sulphur, in that one induces the reduction of the said iron oxides by means of at least one part of carbon monoxide (CO) contained in the said gaseous compounds of carbon, in that one fixes by means of the said desulphurising agent at least one part of the sulphur of the said gaseous compounds of sulphur, in that one separates the said reduced oxides and the layer containing residues of the said solid reducing agent containing carbon and of the said desulphurising agent.

One notes that despite the absence of binding material the reduction of the finely separated iron oxides leads to an agglomeration of these iron oxides in a cake consisting of sponge iron which is easy to separate from the granular layer made up of the residues of the solid reducing agent containing carbon and desulphurising agent.

It is well known that the gasification of the solid reducing agent containing carbon requires heating to a high temperature in the order of at least 900° C. This heating is carried out in such a way that the gaseous carbon compounds contain essentially carbon monoxide (CO) which is a very reducing gas. The heating system necessary for the gasification is advantageously assumed by burners preferably installed in the vault of the furnace containing the moving floor which produce in particular the $CO_2$ necessary to start Boudouards reaction.

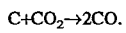
$C+CO_2 \rightarrow 2CO$.

In the preposition of the present invention, the CO resulting from the said gasification penetrates the layer of iron oxides by diffusion where it ensures the reduction of the said iron oxides by the reactions:

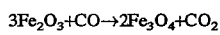
$3Fe_2O_3 + CO \rightarrow 2Fe_3O_4 + CO_2$

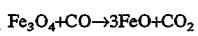
$Fe_3O_4 + CO \rightarrow 3FeO + CO_2$

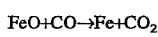
$FeO + CO \rightarrow Fe + CO_2$

The $CO_2$ thus produced in the layer of iron oxides diffuses in turn into the layer containing the solid reducing agent containing carbon, where each mole of $CO_2$ creates again two moles of CO by the Boudouard reaction referred to above. One of these two moles of CO is diffused back into the layer of iron oxides to reduce one iron oxide, while the other mole of CO escapes from the layer containing the solid reducing agent containing carbon to be burnt above the charge, thereby contributing to the heating necessary for the gasification of the solid reducing agent containing carbon.

In order that the two aforesaid functions of reduction and heating can be assured in a satisfactory manner, it is advisable that the solid reducing agent containing carbon is present in sufficient quantity in the layer constituted by the said mix, in the case of fine coal, this quantity is preferably between 250 and 500 kilograms of coal per metric ton of sponge iron produced, according to the content of iron in the iron oxides used.

According to particular implementation of the process of the invention, one deposits successively on the moving floor a first layer of finely separated matter, essentially made up of iron oxides, a second layer of finely separated matter consisting of a mix of the said solid reducing agent containing carbon and of the said desulphurising agent, one then heats this charge to ensure the gasification, at least partial, of the solid reducing agent containing carbon, the reduction of the iron oxides and the desulphurisation of the gases obtained, as indicated above, and one separates the sponge iron and the finely separated matter containing the residues of the said solid reducing agent containing carbon and the said desulphurising agent.

This particular manner is very interesting, because the upper layer contains the solid reducing agent with carbon; it will be so the place of the gasification reaction, which is very endothermic. To this end it is advantageous that it can be directly and intensely heated by means of heating the charge, in particular by the burners located in the vault of the furnace. On the contrary, the reactions of reduction are practically athermic and do not require from thereon in the input of substantial heat.

It is even within the ambit of the present invention to invert the order of the superposed layers and even to envisage more than two layers superposed alternately on the floor.

Moreover it goes without saying that the solid reducing agent containing carbon usable within the ambit of the present process is not limited to fine coal but also extends to other carbon bearing substances such as coke, pitch, coke dust, charcoal and other similar substances.

In the course of the gasification of the said solid reducing agent containing carbon, there are also formed gaseous compounds of sulphur; these re-act immediately with an appropriated desulphurising agent to form solid compounds which remain in the said layer containing the said solid reducing agent containing carbon.

According to a supplementary characteristic, one fixes at least one part of the sulphur of the said gaseous sulphur compounds by means of a solid desulphurising agent. Among the usable desulphurising agents certain calcium compounds notably lime (CaO) and castine ($CaCO_3$) are particularly suitable, on the one hand because of their efficacity in reacting with the gaseous compounds to form solid compounds and on the other hand because of their economic characteristics. In particular, lime can be used in the form of a lime milk impregnating at least one part of the said solid reducing agent containing carbon.

It is well known that the separation of the said reduced oxides and of the layer containing the residues of the said solid reducing agent containing carbon and of the said desulphurising agent is next effected by screening—if necessary after crushing the sponge iron, then the granular residue can be submitted to a magnetic separation to recuperate the particles of iron which could have been carried over from the screening.

Following another supplementary characteristic, one deposits a thin layer of fine carbon between the said two superposed layers making up the charge with a view to avoid sticking of the said desulphurising agent or of the compounds which contain it, at the layer of the iron oxides when heating to ensure the gasification of the solid reducing agent containing carbon.

Following another interesting characteristic, one compacts at least one of the layers making up the charge, with a view to improving the transfer of the heat to the heart of the said layer. This compacting can for example be effected by a roller placed above the mobile floor.

Following an interesting implementation, the iron oxides can be placed in the form of separate masses of small dimensions and of whatever form, such as round or square and these masses are then surrounded by finely separated matter containing the said solid reducing agent containing carbon and the said desulphurising agent. In the course of the reduction, the said masses are agglomerated in pieces of sponge iron which it is only necessary to screen without crushing to separate them from the residual granular material.

The sponge iron, cooled if necessary, which has a feeble sulphur content is already usable without difficulty in the electric arc furnaces of steelworks.

Nevertheless, the present invention aims also to put forward a process of enrichment in carbon of this sponge iron so that it contains a source of energy sufficient to lower, in substantial proportions, the consumption of energy required for its fusion in an electric furnace. This supply of carbon is realised by simple methods, from gaseous hydrocarbon, if necessary recuperated from various industrial processes. It has the important advantage of not introducing sulphur into the sponge iron, which favourably influences the quality of the steel produced from this sponge iron.

For various metallurgical reasons and also to reduce this consumption of electric energy it is accepted practice to inject a pulverisable solid combustible, such as fine coal or coke dust, and oxygen into the molten bath; these injections provoke a release of CO which burns above the slag floating on the bath of fused metal. This known process however carries the serious drawback of incorporating in the steel not insubstantial quantities of sulphur coming from the coal or coke injected, which has the effect of degrading, sometimes to a substantial degree, the quality of the steel.

In accordance with the present invention, a process for manufacturing a sponge iron with low sulphur and high carbon content, is characterised in that one exposes a hot sponge iron to a gas containing a gaseous hydrocarbon, in that one realises the thermal cracking of the said gaseous hydrocarbon in contact with the said hot sponge iron, in that one puts at least one part of the particles of carbon resulting from the said thermal cracking on the surface of the hot sponge iron, and in that one cools the said hot sponge iron to a temperature between 600° C. and 800° C. and preferably close to 700° C.

The exposure of the said hot sponge iron to the said gaseous hydrocarbon is preferably continuous, in particular in a furnace run counter-current by the gas containing the said gaseous hydrocarbon.

The gaseous hydrocarbon contained in the aforesaid gas is a gas capable of producing particles of carbon such as graphite or soots by thermal cracking at the temperatures at which the hot sponge iron is initially found; in general these temperatures are between approximately 900° C. and 1300° C.

One could however envisage extra heating of the sponge iron to favour thermal cracking of this gaseous hydrocarbon.

According to a particular implementation it has been found to be interesting to use a gaseous hydrocarbon such as methane ($CH_4$) which is generally available in iron and steelworks notably in the form of natural gas. The said gaseous hydrocarbon can be present in any degree in the said gas and can even be injected in substantial proportions in its pure state.

The thermal cracking of the said gaseous hydrocarbon is a largely endothermic operation. Moreover from the deposit of the carbon particles there is a considerable cooling of the sponge iron. This cooling can be sufficient to lower the temperature of the sponge iron to the value aimed at; a value of between 600° C. and 800° C., preferably in the area of 700° C. If it should turn out that the cooling due to the cracking does not allow the temperature to be obtained, it could be prolonged by continuing injection of the said gaseous hydrocarbon until the desired temperature is obtained.

As a general rule the cooling is not continued to room temperature for it can perhaps be advantageous either to load the hot sponge iron directly into the electric furnace or to use it to make briquettes in a hot press.

By reason of the porosity of the sponge iron the treatment gas can penetrate to the core of the metallic mass and the thermal cracking involves the deposit of particles of carbon distributed in this mass. For the purposes of the present request the deposit of carbon on the surface of the sponge iron encompasses the deposit on the interior surfaces of the pores at the heart of the mass of the sponge iron.

The carbon thus deposited has the advantage of being clean; that is to say, of not being contaminated by undesirable substances such as sulphur, as is often the case with coal particles. One part of the enrichment in carbon can consist in the formation of a certain quantity of cementite $Fe_3C$ which results in the direct reaction of the iron with the carbon at the temperature of the thermal cracking.

Finally the residual hot gas rich in hydrogen leaving the stage of the thermal cracking can be directly recycled preferably in the process of the manufacture of sponge iron itself; notably in the reduction stage of this process where it serves not only as reducing agent but also as generator of the heat by combustion.

Figure 2:
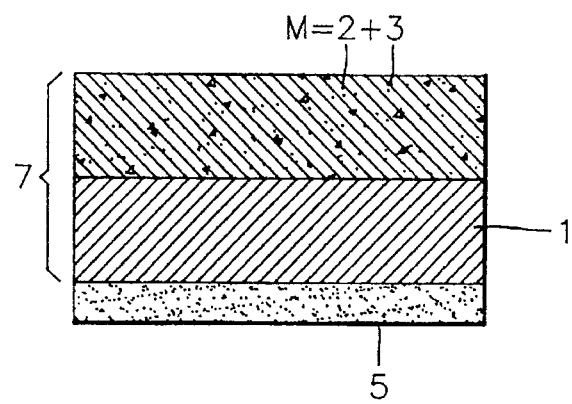

The process of the invention will be explained in a more detailed manner in the description which follows where reference is made to the drawings annexed in which FIG. 1 illustrates diagrammatically the operations making up one particular variant of the process of the invention and FIG. 2 represents a cross section of the charge deposited on a turning floor.

In the variant illustrated in FIG. 1 oxides of iron finely divided I and a mix M made up of fine coal 2 and of castine 3 formed in a mixer 4 are deposited in superposed layers on a turning floor 5 in a moving fire furnace 6. The charge 7 thus constituted consists of a lower layer of iron oxides 1 and of an upper layer of mix M of fine coal 2 and of castine 3. The structure of the charge 7 is diagrammatically shown in the cross section A—A represented in FIG. 2 where one can see the two superposed layers. In this furnace 6 the charge 7 is heated by means of burners, not shown, to a temperature sufficient to effect the gasification, at least partial, of the fine coal 2. There is therefore produced at the heart of the upper layer a release of CO which by the mechanism referred to above assures on the one hand the reduction of the iron oxides of the lower layer and on the other hand the heating of the charge 7. Simultaneously the heating of the charge 7 leads to a release of the gaseous compounds of sulphur coming from the coal. These gaseous compounds are immediately put into contact with the desulphurising agent that is to say the castine 3 dispersed to the heart of the upper layer and the sulphur is immediately fixed by the desulphurising agent in the form of solid granular compounds. The presence of the castine accordingly allows you to fix better the sulphur of the gaseous compounds of sulphur as the castine is more finely distributed in the upper layer. When the reduction of the iron oxides and the desulphurisation of the gaseous compounds of sulphur are finished and despite the absence of a binding agent the charge present on the mobile floor is composed finally of an agglomerated lower layer making up the sponge iron and an upper layer of granular material composed of the residues of the solid reducing agent containing carbon and of the desulphurising agent as well as solid compounds of sulphur resulting from the said desulphurisation. In this advantageous way one can foresee at this moment a phase of enriching in carbon of the sponge iron making circulate in the furnace above the hot charge a current of gaseous hydrocarbon such as methane ($CH_4$) of which the thermal cracking produces particles of clean carbon distributed in the mass of the sponge iron; this variant is of great interest for the pursuance of the metallurgic operation of steelworks.

A stage of screening 8 if necessary preceded by crushing is envisaged at the exit from the furnace 6 to separate the iron sponge and the granular residues R chiefly composing the ashes of the solid reducing agent containing carbon and the solid compounds of sulphur such as sulphur CaS. The hot sponge iron is then sent to a cooler 9 from which one extracts continuously an sponge iron Fe with low sulphur content.

An important advantage of the process of the invention rests in the absence of a stage of pelletising the iron oxides with or without pulverised coal which allows considerable simplification of the installation and consequently a substantial reduction of investment costs. The process is equally advantageous because no binding material is used. Finally an immediate fix is assured of the sulphur coming from the solid reducing agent containing carbon, that is to say, the fine coal at the very heart of the layer which contains it, so as to avoid the introduction of sulphur into the sponge iron.

The invention process is not limited to the example which has just been described and illustrated. It also includes modifications that a specialist could contribute in particular in relation to the choice of the desulphurising agent and the number or the arrangement of the layers superposed on the mobile floor.

We claim:

1. A process of manufacturing a sponge iron with low sulphur content, said process comprising:

depositing a charge made up of superposed layers of finely divided material on a moving hearth, at least one of said layers being substantially made up of iron oxides and at least another of said layers being made up of a mix of a solid reducing agent containing carbon and a desulphurizing agent, heating said charge to cause at least partial gasification of said solid reducing agent containing carbon in the form of gaseous compounds of carbon and sulphur, reducing said iron oxides by means of at least part of carbon monoxide (CO) contained in said gaseous carbon compounds, fixing at least part of the sulphur of said gaseous sulphur compounds by means of said desulphurizing agent, and separating said reduced iron oxides from the material containing the residues of said solid reducing agent containing carbon and said desulphurizing agent.

2. Process according to claim 1, wherein:

a first layer, called lower layer, of finely divided material consisting of iron oxides is deposited on said moving hearth, a second layer, called upper layer, of finely divided material consisting of a mix (M) of said solid reducing agent containing carbon and said desulphurizing agent is deposited on said first layer, said materials are heated to cause at least partial gasification of said solid reducing agent containing carbon in said upper layer, said iron oxides in said lower layer are reduced by means of at least part of carbon monoxide (CO) produced by said gasification, at least part of the sulphur of said gaseous sulphur compounds is fixed by means of said desulphurizing agent, and said reduced iron oxides are separated from the material containing the residues of said solid reducing agent containing carbon and said desulphurizing agent.

3. Process according to claim 1, further comprising depositing a thin layer of fine coal between the superposed layers constituting said charge.

4. Process according to claim 1, further comprising compacting at least one of the layers constituting said charge.

5. Process according to claim 1, further comprising heating the charge to a temperature of at least 900° C., to cause the gasification of said reducing agent containing carbon.

6. Process according to claim 2, further comprising incorporating said solid reducing agent containing carbon in said mix (M) in quantity of between 250 and 500 kg of carbon per metric ton of sponge iron produced.

7. Process according to claim 1, further comprising using a compound of calcium as a desulphurizing agent.

8. Process according to claim 7, wherein said calcium compound is lime (CaO).

9. Process according to claim 7, wherein said calcium compound is castine ($CaCO_3$).

10. Process according to claim 1, further comprising depositing at least part of said iron oxides in the form of separated masses and surrounding said masses with finely divided material containing said solid reducing agent containing carbon and said desulphurizing agent.

11. Process according to claim 1, further comprising:

exposing the sponge iron, when heated, to a gas containing a gaseous hydrocarbon, realizing thermal cracking of said gaseous hydrocarbon on contact with said hot sponge iron, depositing at least part of the carbon particles resulting from said thermal cracking on the surface of the hot sponge iron, and cooling said sponge iron to a temperature between 600° C. and 800° C.

12. Process according to claim 11, wherein said gaseous hydrocarbon is constituted by methane.

* * * * *